Figure 1:
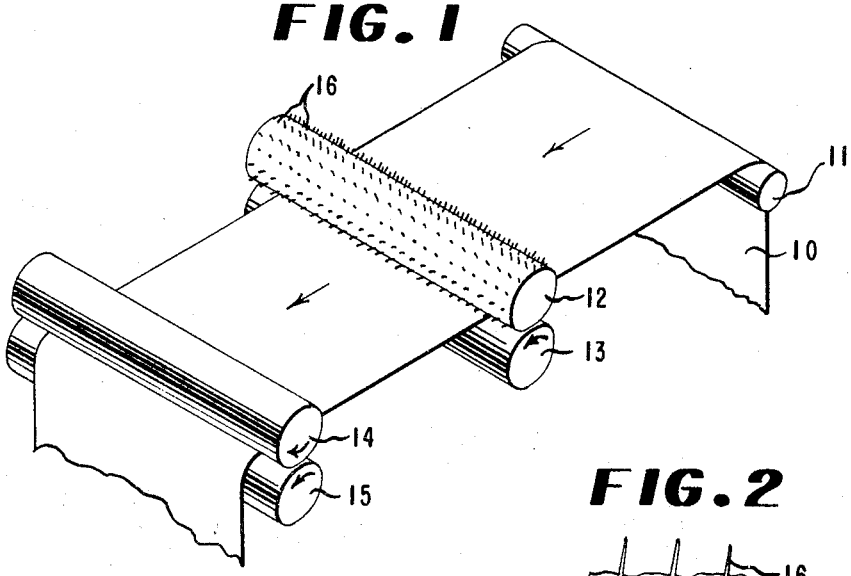
Figure 2:
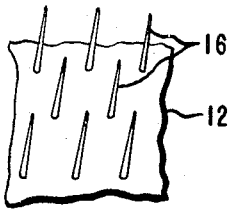
Figure 3:
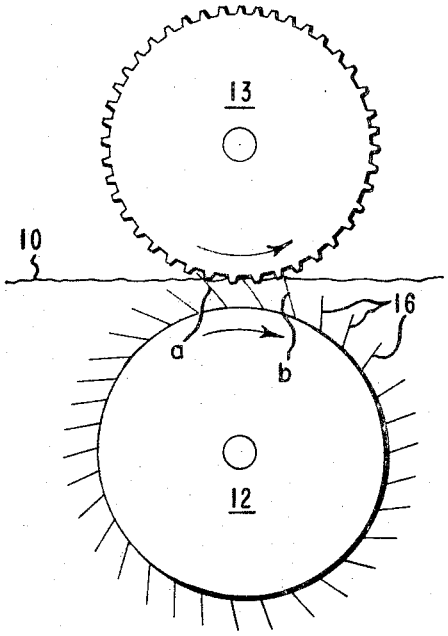
Figure 4:
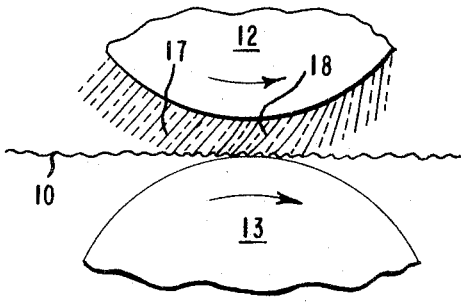

T861030

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 704

718,440

APPARATUS FOR DEREGISTERING CRIMPS IN A LONGITUDINALLY MOVING TOW

Paul Morrison Cole, Carcroft, Del., assignor to E. I. du Pont de Nemours and Company, Wilmington, Del., a corporation of Delaware

Filed Apr. 3, 1968. Published Apr. 15, 1969
Int. Cl. D01b *3/10, 3/04*
U.S. Class 19—65
1 Sheet Drawing. 14 Pages Specification

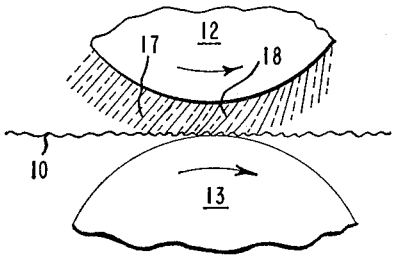

The improvement in an apparatus for deregistering crimps in a longitudinally moving filamentary tow band of the type having tow delivery means, tow-take-up means with said delivery and take-up means defining a tow path therebetween, and a cylindrical roller rotatably mounted on one side of the tow path, said roller having a peripheral surface of a width at least equal to said tow path width and having a plurality of resilient needles extending outwardly from said surface with the roller being arranged to extend the needles through said tow path thickness, said needles being inclined from a radial line extending from the axis of said roller through the base of said needles in a direction away from said take-up means when said needles are in the tow path region; the improvement of a needle-receiving surface arranged on a side of said tow path opposite to said needled roller and spaced from said roller a sufficient distance to form a nip interference zone to cause said needles to bear against said surface and deflect said resilient needles backwardly in a direction away from said take-up means, the needles in adjacent longitudinal rows being staggered to cause a sequential deflection of adjacent needles and the consequent alternate longitudinal displacement of adjacent filaments.

April 15, 1969 P. M. COLE DEF. PUB.

APPARATUS FOR DEREGISTERING CRIMPS IN A LONGITUDINALLY MOVING TOW

Filed April 3, 1968

SN - 718440 T861030

INVENTOR
PAUL M. COLE

BY E. Leigh Hunt

ATTORNEY